United States Patent [19]

Gentile et al.

[11] Patent Number: 5,069,959
[45] Date of Patent: * Dec. 3, 1991

[54] STRUCTURAL COMPOSITES OF FLUOROPOLYMERS REINFORCED WITH CONTINUOUS FILAMENT FIBERS

[75] Inventors: Wayne F. Gentile, Newark, Del.; Harvey L. Kliman, Chadds Ford, Pa.; William H. Krueger, Wilmington, Del.

[73] Assignee: E. I. Du Pont de Nemours and Company, Wilmington, Del.

[*] Notice: The portion of the term of this patent subsequent to Dec. 4, 2007 has been disclaimed.

[21] Appl. No.: 592,178

[22] Filed: Oct. 9, 1990

Related U.S. Application Data

[63] Continuation-in-part of Ser. No. 394,695, Aug. 16, 1989, Pat. No. 4,975,321, which is a continuation-in-part of Ser. No. 209,085, Jun. 20, 1988, abandoned.

[51] Int. Cl.⁵ .......................... D04H 3/02; B32B 27/00
[52] U.S. Cl. .................................. 428/294; 428/295; 428/421; 428/422
[58] Field of Search ................. 428/294, 295, 421-422, 428/288, 303, 317.9; 264/108; 174/25 R; 138/178; 165/180; 526/206

[56] References Cited

U.S. PATENT DOCUMENTS

| 3,217,083 | 11/1965 | Gore | 174/25 R |
| 3,455,338 | 7/1969 | Pollit | 138/178 |
| 3,528,954 | 9/1970 | Carlson | 526/206 |
| 3,635,926 | 1/1972 | Gresham | 526/206 |
| 3,718,181 | 2/1973 | Reilly et al. | 165/180 |
| 3,833,453 | 9/1974 | Segal | 428/303 |
| 4,037,013 | 7/1977 | Sprague | 428/310 |
| 4,414,356 | 11/1983 | Michel | 524/496 |
| 4,422,992 | 12/1983 | Michel | 264/108 |
| 4,640,861 | 2/1987 | Binnersley et al. | 428/294 |

Primary Examiner—Thomas J. Herbert, Jr.

[57] ABSTRACT

A composite comprising a fluoropolymer resin matrix reinforced with continuous filament aligned fibers for use in corrosive high temperature environments.

1 Claim, 3 Drawing Sheets

STRUCTURAL COMPOSITES OF FLUOROPOLYMERS REINFORCED WITH CONTINUOUS FILAMENT FIBERS

CROSS-REFERENCE

This application is a continuation-in-part of our copending application Ser. No. 07/394,695 filed Aug. 16, 1989, U.S. Pat. No. 4,975,321 which in turn is a continuation-in-part of Ser. No. 07/209,085 filed June 20, 1988, now abandoned.

BACKGROUND

This invention relates to a fluoropolymer resin matrix reinforced with continuous filament fibers and more particularly it relates to structural composites formed from such a resin matrix for use in corrosive high temperature environments.

Although fluoropolymer resins are known to be corrosion resistant in harsh chemical environments, fiber reinforced composites for structural end uses based on these resins have not been considered practical because of the low strength and low bending moduli. Mechanical properties equivalent to conventional composites have not been obtainable. It would be highly desirable to provide a composite structure with high stiffness, strength and corrosion resistance suitable for high temperature operating conditions found in harsh chemical environments.

SUMMARY OF THE INVENTION

A composite comprising a matrix fluoropolymer resin reinforced with continuous filament fibers such as glass, carbon or aramid fibers. The fibers may be in the form of a fabric as well as the form of a filament array. Suitable fluoropolymer resins are fully or partially fluorinated polymers such as PETFE (ethylene-tetrafluoroethylene) fluoropolymer, PFA (perfluoroalkoxy) fluorocarbon resin, FEP (fluorinated ethylene propylene), P-ECTFE (ethylene-co-chlorotrifluoroethylene), and PVDF (polyvinylidene fluoride). Shaped non-planar as well as planar structures formed therefrom are also encompassed.

The ratio of continuous filament fiber reinforcement to matrix resin can vary from about 10% to about 70% by volume, but preferably is between 30% to 70% by volume.

DETAILED DESCRIPTION OF THE INVENTION

A preferred process for forming a precursor tow of a resin matrix reinforced with continuous filament fibers is disclosed in U.S. Pat. No. 4,640,861 wherein a fiber reinforced material is made by passing a preheated tensioned filament array over an arcuate extruder head wherein polymer is flowed through the filament warp array to coat the filaments with polymer. U.S. Pat. No. 4,640,861 is hereby incorporated by reference. When forming such a tow of carbon fiber with a fluoropolymer resin, it has been found useful for handling the carbon fiber to apply a lubricating finish prior to preheating the filaments.

Other techniques for applying matrix polymer include sprinkling of powdered resin on the fiber followed by heating to melt the resin or intermingling resin fibers with the continuous filament warp, then heating to melt the resin fibers thereby forming the matrix resin and film stacking and/or hot calendaring the warp filament array between layers of matrix film.

Figure 4:
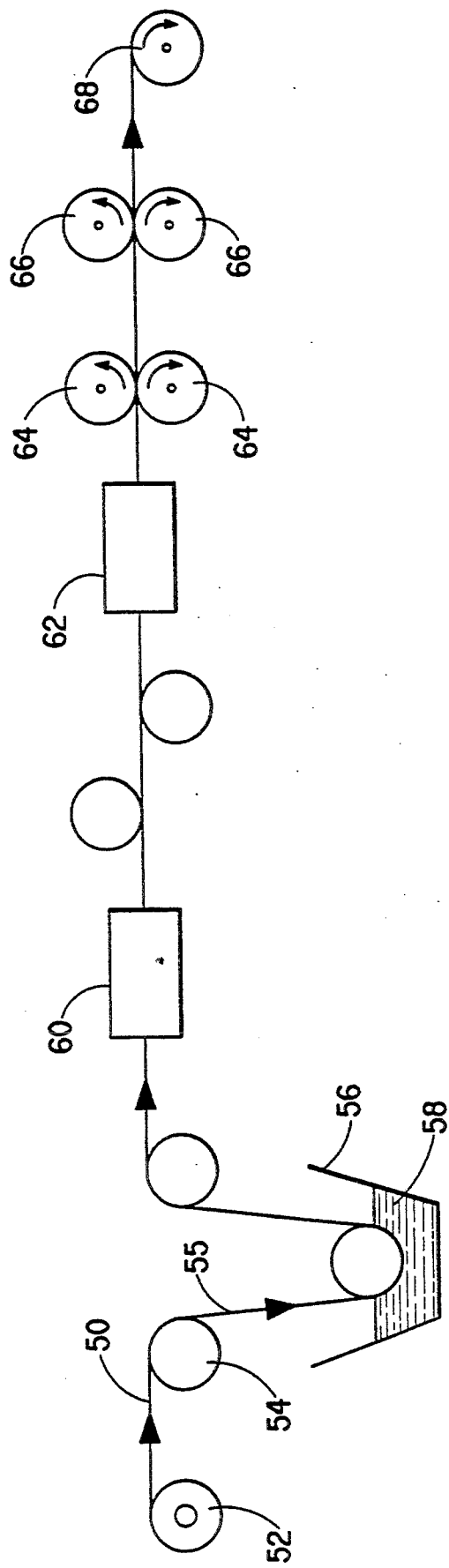
FIG. 4 is a schematic representation of a dispersion coating process for applying high molecular weight fluorocarbons to a continuous filament array.

A particular preferable technique for applying high molecular weight fluoropolymer resins which are not melt processable, i.e. having a melt flow index as measured by ASTM test procedure D2116, below about 15, i.e. in the range of from 2 to about 15, is shown in FIG. 4. More particularly, in FIG. 4 a size free carbon fiber 50 is unwound from a bobbin source 52, passed over an air guide bar 54 to spread the carbon fiber to a uniform array 55 of filaments, then passed into a dip tank 56 containing a PFA dispersion 58 where the filament array is uniformly coated with the dispersion. The coated filament array is dried in heater 60 leaving PFA resin particles on the filament array, then passed through a heater 62 to melt the resin particles following which the filament array and molten resin are calender consolidated as the array passes through calender rolls 64 and then through driven nip rolls 66 to driven windup 68.

The composite structure may be made by a variety of procedures. Thus a tow form as described above may be formed into a filament wound structure or a plurality of segments of such tow may be stacked and heated under pressure to form a distinct composite structure.

Figure 1:
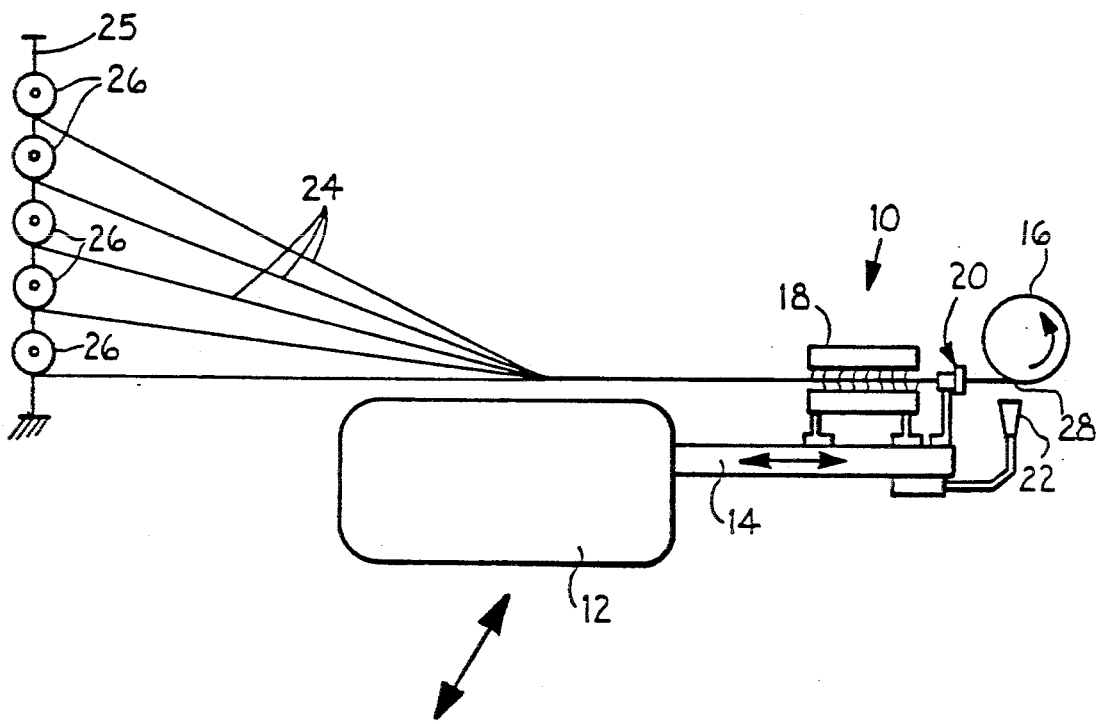
FIGS. 1-3 are schematic representations of apparatus suitable for use in the present invention to form non-planar shaped composite structures.

To form a filament wound structure an apparatus as shown in the drawing and disclosed in our copending U.S. application Ser. No. 095,235 filed Sept. 11, 1987 is used to build a structure from a plurality of lengths of fluoropolymer resin reinforced with continuous filament fibers. More particularly, in FIGS. 1-3 the yarn-laying head used in practicing the invention is generally designated by the numeral 10 and is shown to include a traversing carriage 12 upon which is mounted a feed arm 14 movable toward and away from a rotating mandrel 16. The traversing carriage, feed arm, and mandrel are a model W60-16 triple axis filament winder with a N-210 computer by McClean Anderson of Milwaukee, Wis. Mounted to the feed arm are infra-red heaters 28, a heated guide and an open flame heater 22 (FIG. 1).

As carriage 12 is traversed longitudinally of mandrel 16, a plurality of lengths of thermoplastic resin impregnated yarns 24 are pulled from a plurality of supply packages 26 mounted on rolling takeoff creel 25 against a desired level of back tension applied by a mechanism (not shown) associated with the creel for controlling unwind tension on packages 26 such as a Type 800C012 tension compensator by Compensating Tensions Controls, Inc., of West Caldwell, N.J.

As the yarn-laying head moves with respect to the structure being wound on mandrel 16, the thermoplastic resin impregnated lengths of yarn 24 are exposed to radiant heaters 18 (model 5535 manufactured by Research Inc. of Minneapolis, Minn.). In these heaters, the thermoplastic resin is heated to a temperature that is within 10° C. of its melt temperature. The lengths of yarn then pass through a heated guide 20 which in the preferred embodiment is a circular eye made of aluminum with a hard anodized finish coated with Teflon. The guide is wrapped with an electrically operated band heater 20a (such as an MI band heater model MBIEIJNI) which raises the temperature of the thermoplastic to a temperature above its melting point but below its degradation temperature which should be understood to be below the melting point of the reinforcing fibers. Mounted at the forward end of feed arm 14 is an open flame heater 22 (a Vulcan Universal propane torch with a No. 3 tip) over which the tapes 24 pass to the laydown location 28 on the mandrel 16. This heater heats the surface of the part being wound on the mandrel through induced heating of the mandrel and direct heating of lengths of yarn 24 as they travel from the guide 20 to location 28 to ensure molten mating surfaces at laydon location 28.

Figure 2:
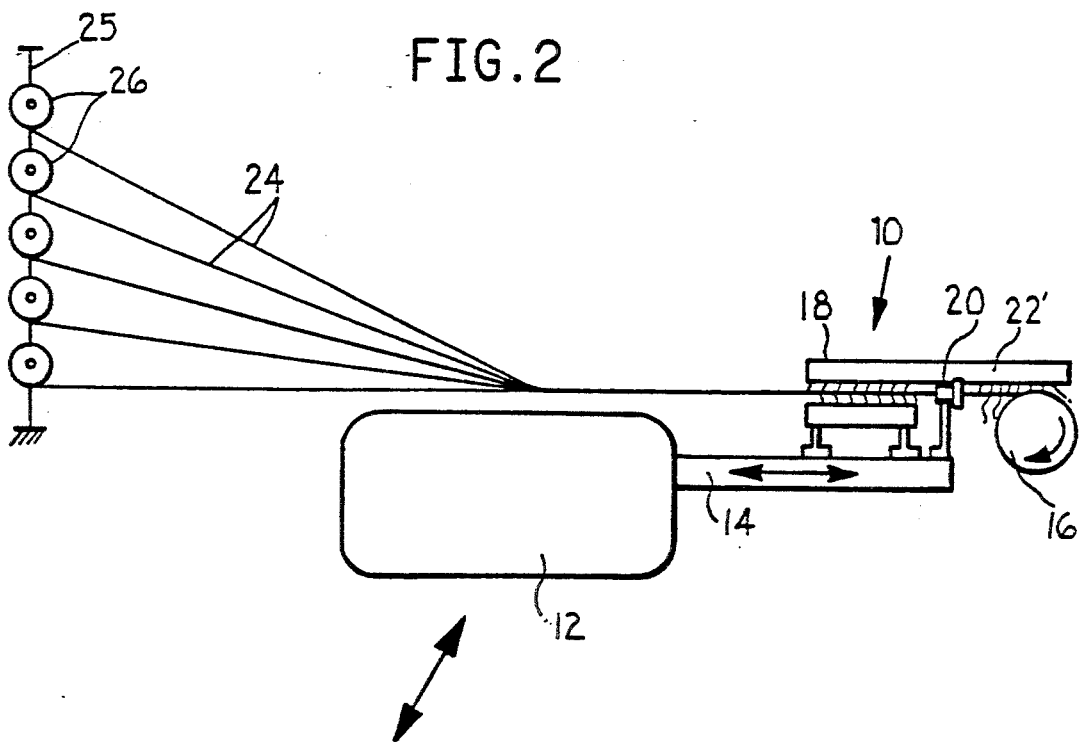
Figure 3:
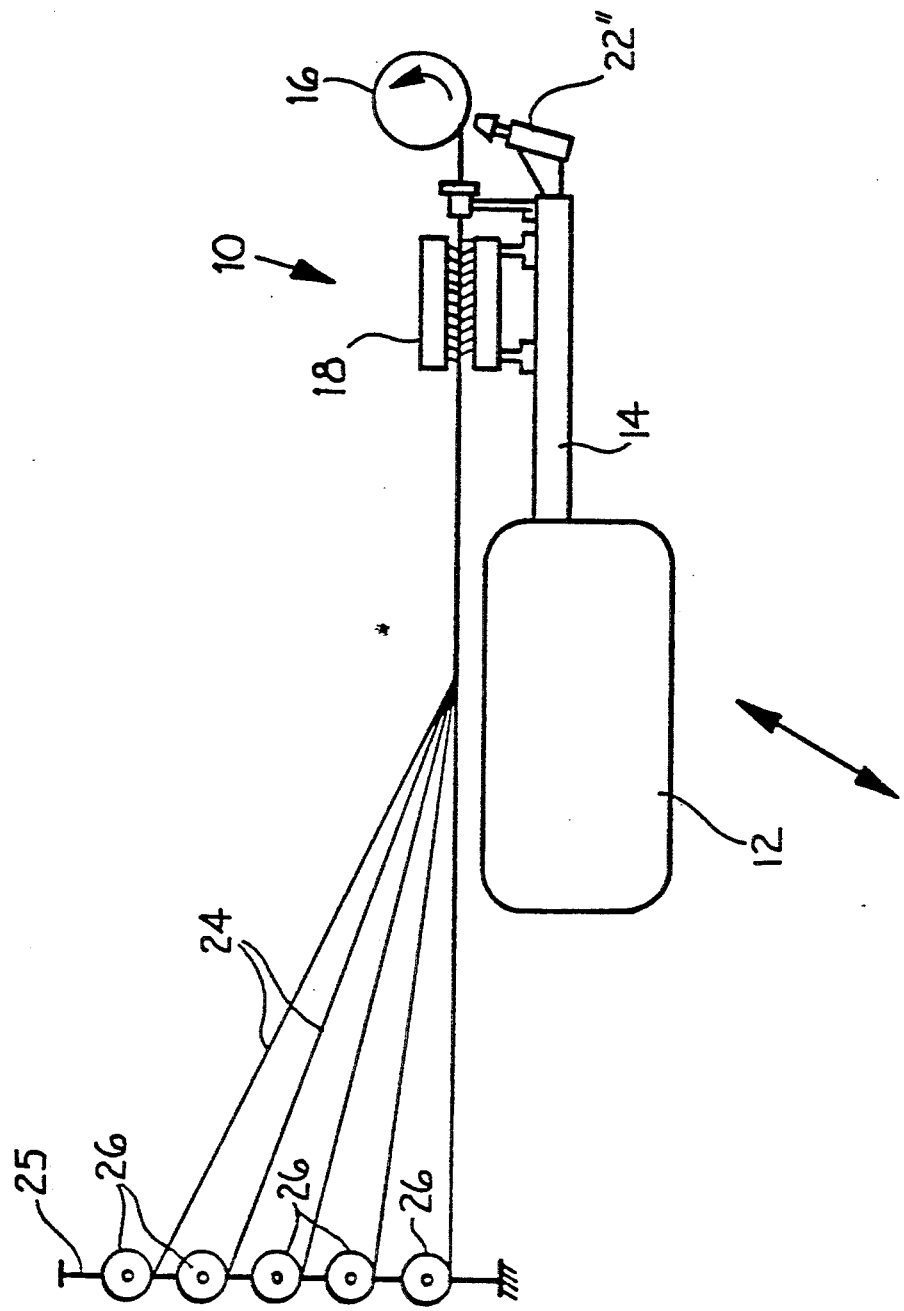

In FIG. 2 the open flame heater 22 is replaced with an infra-red heater 22' (model 5535 by Research Inc.), and in FIG. 3 flame heater 22 is replaced with a hot air gun heater 22" (Serpentine VI model CHE128767 by Sylvania).

EXAMPLE I

A tow of Hercules AS4 continuous graphite filaments having approximately 3000 filaments is coated with ethylene-tetrafluoroethylene copolymer resin (as described in U.S. Pat. No. 4,123,602) using a melt-injection process (as described in U.S. Pat. No. 4,640,861). The ratio of fiber to resin was 40%.

Two to four bobbins of the coated tow of these graphite filaments are mounted on rolling take-off creels equipped with a mechanism for controlling unwind tension (Type 800C 012 tension compensator made by Compensating Tension Controls, Inc.). The tow is advanced by means of a rotating elliptical-shaped mandrel downstream and a tension of approximately 2000 gm is applied to each moving tow by the tension mechanism. The moving tow passes through the "head" portion of the downstream filament winder which contains: (1) a pre-heating section (heated with an infrared heater) which heats the tow to 320° followed by (2) a guide eye which is preheated to 320° C. with band heaters, (3) a hot air heating source which is positioned close to the rotating mandrel (3 cm away) and maintains the temperature of the yarn at 320° C., and (4) the tow is finally laid down on an electrically heated mandrel (at about 280° C.).

The computer controlled winder is preprogrammed to produce a 6 ft. long tube with ±45°/90°/±45°/90°/±45°/90° winding angles.

After completing the winding, the mandrel and the tube are cooled for approximately 1 hour until the temperature of the part is about 100° C. These structures performed satisfactorily in corrosive, high temperature environments.

EXAMPLE II

Coated graphite as prepared in Example I was fabricated by frame winding and hot pressing into ⅛" thick unidirectional composite plates. More particularly, coated tow as described above was wound on an 8"×8" frame at 18 tows/inch of width to a total of 16 layers. This unidirectional assembly was hot pressed at 50 psi and 250° C. for 10 minutes to partly consolidate it. The partly consolidated material was cut from the frame and trimmed to 7"×7" to fit a picture frame mold for final consolidation. The mold was put in a heated platen press and heated to 290° C. without pressure. Then the pressure was raised to 250 psi over 10 minutes while the temperature continued to rise to 350° C. Then the pressure was raised to 550 psi and held for 10 minutes. The press was cooled under pressure to approximately 150° C., the pressure released and the mold removed. These plates were subsequently tested per ASTM test procedure D790. The flexural strength was 55,000 psi and the flexural modulus was 11.6 million psi.

EXAMPLE III

A 12" wide band of continuous filament carbon fiber (AS4 from Hercules, Inc.) is formed by spreading approximately 28 tows of 3000 filaments each. This band is fed through a lamination apparatus consisting of a fiber unwind station, guides to align the fibers into a continuous sheet, two film unwinds and guides to position a sheet of film on both sides of the fiber sheet, 14" wide heated nip rolls capable of over 325° C. and over 100 psi, a chiller roll maintained at 50° F., and a winder to take up the product. In the laminator a 12" wide×0.001" thick sheet of PFA fluorocarbon resin film as described in U.S. Pat. No. 3,528,954 is applied above and below the fiber band, forming a sandwich of PFA-/AS4/PFA. This sandwich is subsequently pulled through heated (approximately 305° C.) driven nip rolls of the lamination apparatus at a speed of 5' per minute under a roll pressure of about 60 psi, thereby melting the PFA film and forcing it into the fiber band.

Lamina formed as described above were formed into unidirectional composite plates 7" wide ×7" long×⅛" inch by stacking 12 to 24 layers, then compression molding them.

These plates were subsequently tested per ASTM test procedure D-790. The flexural strength was 40,000 psi and the flexural modulus was 13.3 million psi.

EXAMPLE IV

Coated tow as described in Example I where the continuous graphite filaments are Hercules AS4 fibers in one instance and Celion G30-500 fibers in another instance and the resin is PFA fluorocarbon resin as described in U.S. Pat. No. 3,528,954, type TE-3000, was fabricated by frame winding and not pressing into ⅛" thick unidirectional composite plates. More particularly, coated tow as described above was wound on an 8"×8" frame at 18 tows/inch of width to a total of 16 layers. This unidirectional assembly was hot pressed at 50 psi and 250° C. for 10 minutes to partly consolidate it. The partly consolidated material was cut from the frame and trimmed to 7"×7" to fit a picture frame mold for final consolidation. The mold was put in a heated platen press and heated to 290° C. without pressure. Then the pressure was raised to 250 psi over 10 minutes while the temperature continued to rise to 350° C. Then the pressure was raised to 550 psi and held for 10 minutes. The press was cooled under pressure to approximately 150° C., the pressure released and the mold removed. These plates were subsequently tested as per ASTM test procedure D790. The flexural strength was typically about 35,000 to 40,000 psi and the flexural modulus was 10 to 11 million psi.

In the alternative, PFA resins may also be produced by the method described in U.S. Pat. No. 3,635,926.

EXAMPLE V

In a first run a size-free tow of Hercules AS4 continuous graphite filaments having approximately 12,000 filaments is coated with PFA-335J dispersion (by Du Pont) using a dispersion coating process similar to FIG. 4. The PFA-335J dispersion is commercially available in 50% concentration, 0.5 micron particle size.

The line speed was in the range of 20 to 35 feet per minute with the 50% dispersion concentration to obtain the fiber volume fraction in the range of 0.30 to 0.60. The temperature of the heater was about 350° C. but was changed proportionally with a change of line speed. The calender roll gap was adjusted between 6-8 mils for fiber to resin ratio of 30-60%. In a second run the coating process described above is repeated only using a PFA 340 dispersion.

The composite parts from the first run were tested per ASTM test procedure D-790. The flexural modulus was 10.2 MSi and the flexural strength was 43.0 KSI. The PFA 335J fluoropolymer resin matrix had a melt flow index of 2 as determined by ASTM test procedure D2116. The PFA 340 resin matrix had a melt flow index of 13.

We claim:

1. A composite comprising: a matrix PFA (perfluoroalkoxy) fluorocarbon resin having a melt flow index of from about 2 to about 30 reinforced with continuous filament fibers, said matrix resin being from about 30% to about 70% by volume of said composite, said composite having a flex modulus above 5 million psi.

* * * * *

UNITED STATES PATENT AND TRADEMARK OFFICE
CERTIFICATE OF CORRECTION

| | |
|---|---|
| PATENT NO. | : 5,069,959 |
| APPLICATION NO. | : 07/592178 |
| DATED | : December 3, 1991 |
| INVENTOR(S) | : Gentile et al. |

It is certified that error appears in the above-identified patent and that said Letters Patent is hereby corrected as shown below:

Title Page, [ * ] Notice: Delete, "The portion of the term of this patent subsequent to Dec. 4, 2007 has been disclaimed." and Substitute: [ * ] Notice: --The portion of the term of this patent subsequent to the expiration of Pat. No. 4,975,321 is disclaimed.--

Signed and Sealed this

Fourth Day of September, 2007

JON W. DUDAS
*Director of the United States Patent and Trademark Office*